United States Patent [19]
Malinge

[11] 4,057,336
[45] Nov. 8, 1977

[54] PHOTOGRAMMETRIC PLOTTING APPARATUS

[75] Inventors: Noël Malinge, Clichy Sous Bois, France

[73] Assignee: Engins Matra, France

[21] Appl. No.: 693,176

[22] Filed: June 7, 1976

[30] Foreign Application Priority Data

June 26, 1975 France .............................. 75.20164

[51] Int. Cl.² .................................................. G03B 21/00
[52] U.S. Cl. .......................................... 353/6; 353/8; 33/20 D
[58] Field of Search ........................................ 353/5–9, 353/30, 37, 20; 356/2; 33/20 D, 1 A; 350/130, 132, 136

[56] References Cited

U.S. PATENT DOCUMENTS

| | | | |
|---|---|---|---|
| 2,669,901 | 2/1954 | Rehorn | 353/8 |
| 3,134,297 | 5/1964 | Carlson et al. | 353/37 |
| 3,191,493 | 6/1965 | Mainardi et al. | 353/8 |
| 3,304,434 | 2/1967 | Koster | 33/141.5 |

FOREIGN PATENT DOCUMENTS 976,731   12/1964   United Kingdom ............... 33/20 D

*Primary Examiner*—Harry N. Haroian
*Attorney, Agent, or Firm*—Larson, Taylor and Hinds

[57] ABSTRACT

A photogrammetric plotting apparatus comprises means to move two stereographic plates in their plane with respect to two respective optical systems which are arranged to project onto a single screen images of reference marks indicating the trace of the line of sight of each optical system on the respective plate. Different polarizers are disposed on the lines of sight of the optical systems so that an operator looking at the said screen through two analyzers corresponding to the polarizers sees the images of the region of one plate and its respective reference mark with one eye and the image of the corresponding region of the other plate and its respective reference mark with the other eye.

14 Claims, 4 Drawing Figures

PHOTOGRAMMETRIC PLOTTING APPARATUS

BACKGROUND OF THE INVENTION

This invention relates to a photogrammetric plotting apparatus of the kind having means for moving two stereographic plates in their plane with respect to two optical systems so as to bring corresponding regions of the two plates into the optical axes or the lines of sight of the two optical systems, and means for indicating, by a reference mark, the trace of the line of sight on each plate, the plotting apparatus also comprising a permanently-located plate-observing device.

The invention relates more particularly, as its most promising though not exclusive application, to photogrammetric plotting devices in which the motion of the stereographic plates is controlled by analytical computing means.

SUMMARY OF THE INVENTION

The main aim of the invention is to provide photogrammetric plotting apparatus of the previously-defined kind which is closer to practical requirements than prior-art apparatus, inter alia by being simpler to use, more efficient, and less tiring for the operator who observes and interprets the plates.

According to the invention, a photogrammetric plotting apparatus of the previously-defined kind is characterised in that the optical systems are adapted to project, on a single screen, images of corresponding regions of the plates and reference marks, and that different polarisers are disposed on the respective optical axes lines of sight at a place such that the images of a reference mark and of the associated plate are provided by the same polarised light, the assembly being such that an operator, provided with analysers corresponding to the polarisers and situated at a stationary observation post in front of the screen, sees the image of a region of one plate and of the associated reference mark with one eye only, and the image of the corresponding region of the other plate and of the associated reference mark with the other eye only.

The polarisers can be rectilinear polarisers having respective polarisation directions located at 90° to one another.

A polarising filter is disposed on one of the lines of sight so as to polarise the light in one direction, inter alia the vertical direction, whereas another polarising filter is placed on the other line of sight so as to polarise the light in a direction perpendicular to the direction of the first polarisation, inter alia a horizontal direction. Preferably a device is provided for adjusting the light intensity along at least one line of sight, the adjusting device comprising another rectilinear polarising filter rotatably mounted around the line of sight so that the polarisation direction of the second filter, for the line of sight in question, can be made parallel to the polarisation direction of the first filter for the same line of sight, in which case the light intensity is at a maximum, or can be progressively rotated with respect to the polarisation direction of the first filter, thus progressively reducing the light intensity.

In a variant, the polarisers can be circular, one rotating to the right and the other to the left.

Advantageously the reference mark associated with each plate is formed by a diaphragm having a small-diameter aperture (of the order of 20–40 microns) and illuminated by an illuminating device comprising a lamp and condenser. The diaphragm is disposed symmetrically with the trace of the line of sight on the plate, with respect to a semi-transparent mirror inclined at 45° to the plane of the plate, the mirror reflecting the line of sight perpendicular to the plane of the plate.

A lens is disposed downstream of the semi-transparent mirror in the direction of the light, so as to project the image of the region of the plate and of the reference mark on to the screen.

The two plates are disposed in different planes and an optical system, inter alia a mirror system, reflects the images of corresponding regions of the plates on to the screen.

Advantageously, one of the mirrors associated with a line of sight and disposed between the lens and the screen is rotatable so that if the mirror is moved through an angle, the spacing between the images projected on to the screen can be changed, thus modifying the appearance of relief.

Preferably a device having an odd number of mirrors, inter alia three mirrors, one of which is parallel to the line of sight and the other two of which are inclined through the same angle in opposite directions from the line of sight, is provided downstream of the lens of each optical system associated with a plate, the three-mirror assembly being mounted on a rotary holder adapted to rotate around a geometrical axis coinciding with the axis of sight. The assembly comprising an odd number of mirrors is rotatable around the line of sight, so that the image projected on to the screen is rotated around its center, thus controlling the relative orientation of the two images projected on to the same screen.

The photogrammetric plotting apparatus also comprises a tracing or display device; advantageously the tracing or display device is disposed at the side of an observation post for an observer facing the projection screen, the useful edge of the tracing device near the screen being situated at less than 90 cm from the vertical plane extending through the center of the screen.

The observation post is situated in a substantially right angle, one side of which is constituted by the edge of a console in front of the screen and the other side of which is constituted by an edge of the tracing or display device; thus the observation post is near the screen and the useful region of the tracing or display device, so that the observer can easily see the plotting means from his observation point.

Advantageously the means for moving the plates in their plane are disposed on a console in front of the screen.

The means for moving the plates in their plane comprise means for introducing two coordinates and comprising a sphere adapted to rotate freely in a dish forming a bearing and also comprising rollers cooperating with the sphere, the planes of the rollers being diametral planes of the sphere perpendicular to one another, the rollers driving coders in rotation, the coders being adapted inter alia to supply numerical information to the computing means. Control means for a single coordinate are provided, comprising a drum or wheel adapted to rotate a coder.

The drum or wheel, like the sphere, projects from the console.

In addition to the features previously set out, the invention has other features which will be described in greater detail hereinafter with reference to a preferred but non-limitative embodiment described in conjunction with the appended drawings.

DESCRIPTION OF PREFERRED EMBODIMENT

Figure 1:
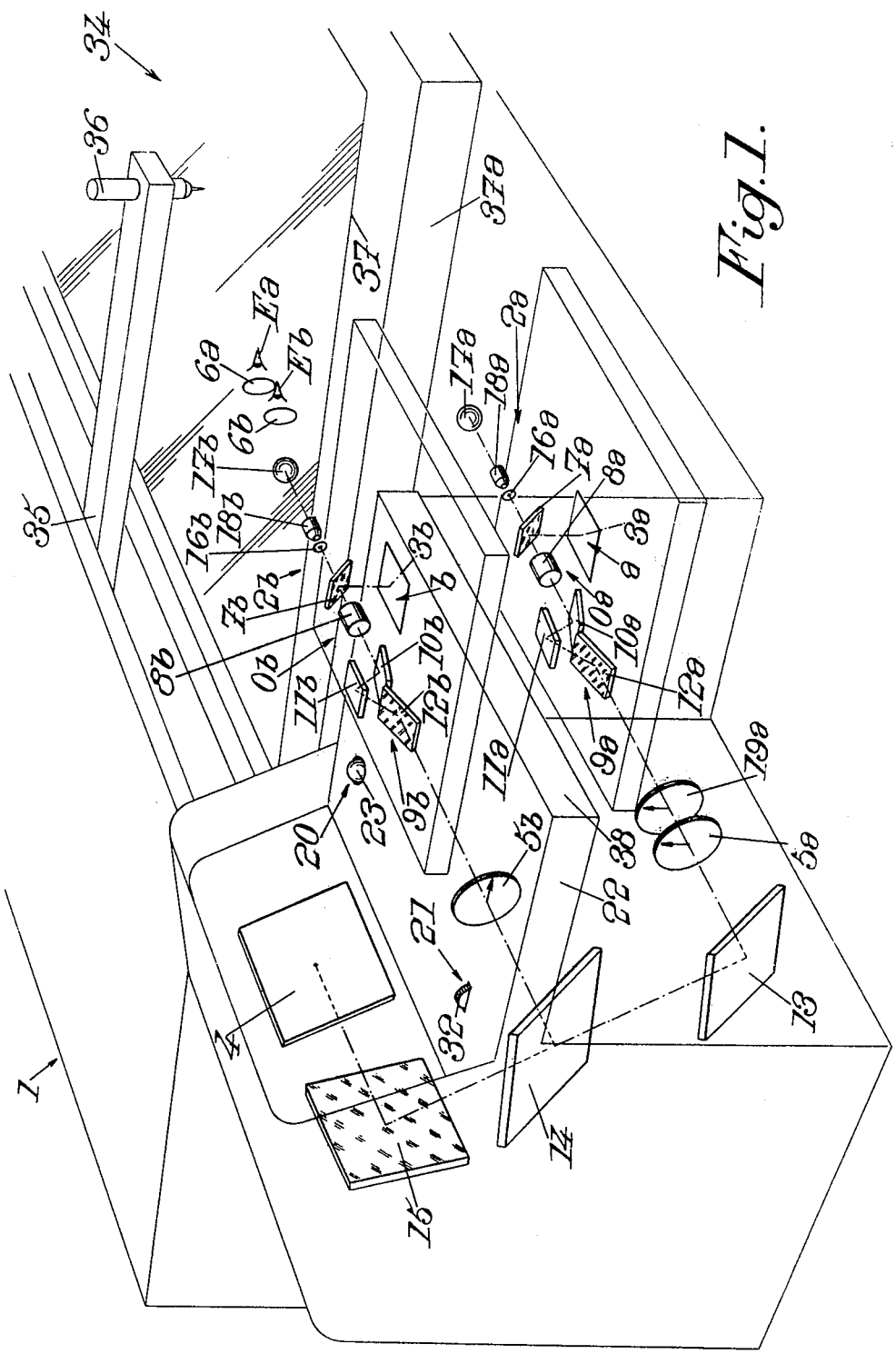
FIG. 1 is a diagrammatic perspective view of a photogrammetric plotting apparatus and observation device according to the invention.
Figure 2:
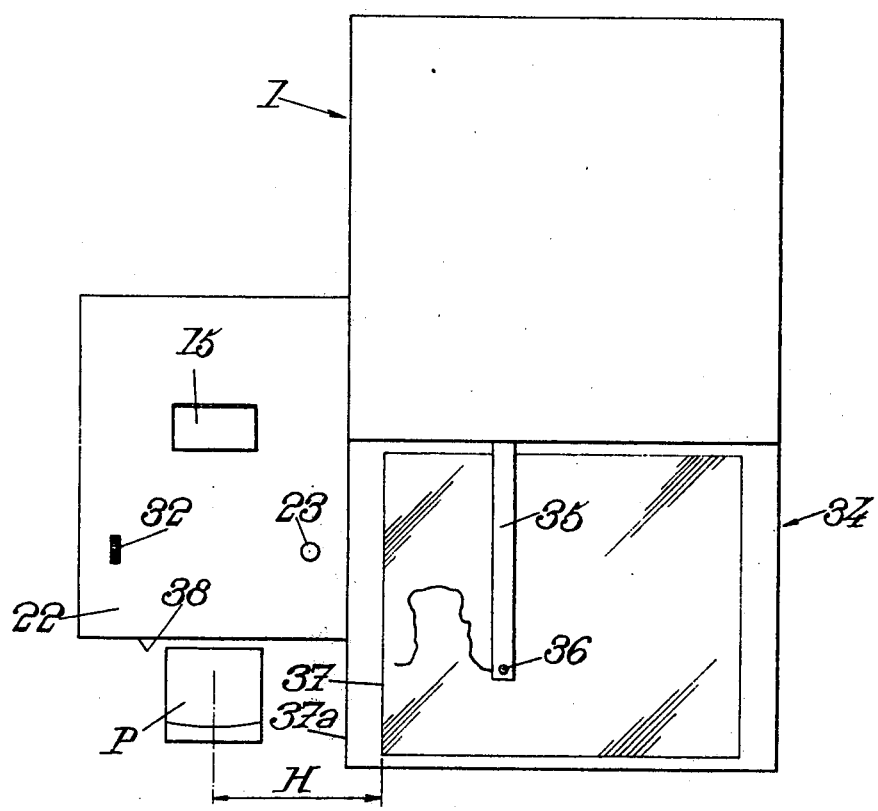
FIG. 2 is a diagrammatic plan view of the apparatus.

FIG. 1 shows a photogrammetric plotting apparatus 1, the external shape of which is shown in outline. The apparatus has means for moving two stereographic plates a, b in their plane with respect to two optical systems Oa, Ob so as to bring corresponding regions of the two plates into the line of sight of the two optical systems. The lines of sight are represented by chain-dotted lines in FIG. 1.

The drawing does not show the means for moving the plates with respect to the optical systems. These means are conventional and may e.g. comprise a table making cross movements so as to move each plate in two directions at right angles. The cross movements can be produced by two orthogonal screws adapted to be rotated inter alia by a motor. One screw cooperates with a nut borne by a slide bearing the plate, so as to move the slide parallel to the screw axis. The other screw is used for moving the assembly comprising the first screw and the slide.

Means 2a, 2b are provided for indicating, by a reference mark, the trace 3a, 3b of the line of sight on each plate.

The optical systems Oa, Ob are disposed so as to project images of the reference marks and of corresponding regions of plates a, b onto a single screen 4. Different polarisers 5a, 5b are placed on the respective lines of sight of optical systems Oa, Ob at a place such that the images of a reference mark and of the associated plate on screen 4 are provided by the same polarised light.

FIG. 1 diagrammatically shows rectilinear polarisers comprising polarising filters. An arrow diagrammatically shows the direction of rectilinear polarisation of light leaving the polarisers.

The polarisation directions of polarisers 5a, 5b are perpendicular. For instance, polariser 5a has a vertical direction of polarisation as shown in the drawing, whereas polariser 5b has a horizontal direction of polarisation.

The assembly is such that an operator, whose eyes Ea, Eb are shown in FIG. 1, and who looks through analysers 6a, 6b comprising polarising filters whose polarisation directions correspond respectively to those of the light which has travelled through polarisers 5a and 5b, can see the image of a region of plate a and of the associated reference mark on screen 4 only with one eye Ea, and can see the image of the corresponding region of the other plate b and of the associated reference mark only with the other eye Eb.

Since the operator sees each image only with a single eye, his view of the observed region is in relief. The two images of the reference marks are likewise seen separately by the eyes of the operator but in fact he appears to see a single "spatial mark". The spatial mark appears above or below or at the same level as the observed region. As is known, the operator acts on the controls of the apparatus so as to move plates a, b so that the "spatial mark" is at the same level as the observed region in the relief view seen by the observer.

The polarisers 5a, 5b can be circular. Each circular polariser may comprise e.g. a rectilinear polariser and a suitably associated quarter-wave plate. One of the circular polarisers rotates to the right whereas the other rotates to the left. Of course, in this case, analysers adapted to the circular polarisers are used.

The optical systems Oa, Ob are similar and it is sufficient to describe e.g. only system Oa. Components of system Ob which are identical with components of system Oa bear the same reference numbers followed by a letter b instead of letter a.

System Oa comprises a semi-transparent mirror 7a inclined at 45°, as shown in FIG. 1, to the perpendicular to the plane of plate a. The plane of plate a is parallel to the plane of plate b and is generally horizontal. Thus the semitransparent mirror 7a is inclined at 45° to the horizontal.

Means are provided for illuminating plate a from below by transparency, the illuminating means not being shown in the drawing.

Downstream of mirror 7a in the direction of propagation of the light from plate a to screen 4, the optical system Oa comprises a lens 8a adapted to project the image of the region of plate a on to screen 4.

The optical axis of the lens is parallel to the plane of plate a; the plane through the optical axis of the lens and perpendicular to plate a is perpendicular to the plane of mirror 7a.

A three-mirror device 9a is provided downstream of objective lens 8a so as to rotate the projected image, if required, around the line of sight.

Device 9a has two mirrors 10a, 12a inclined in opposite directions but at the same angle to the line of sight, and a third mirror 11a parallel to the line of sight and transversely spaced with respect to the first two mirrors. Mirror 10a reflects light to mirror 11a, which reflects light to mirror 12a. The assembly is such that the emerging ray returns the light to mirror 12a. The assembly is such that the emerging ray reflected by mirror 12a is in line with the incident ray on mirror 10a. The three mirrors are secured in a holder mounted so as to rotate around a geometrical axis coinciding with the line of sight. When the holder rotates through an angle, the image projected on to the screen rotates.

More generally, device 9a may have an odd number of mirrors greater than 3.

Downstream of mirror 12a, the line of sight and the light rays through polariser 5a are deflected by reflection by a mirror 13.

Next, the light rays from plate a travel through a semi-transparent mirror 14, which deflects the light rays from plate b by reflecting them in the same manner as mirror 13. Mirrors 13 and 14 are angularly adjustable.

A mirror 15 reflects the images to screen 4. Screen 4 is adapted to be observed by transparency.

The means 2a, 2b for showing the trace of the line of sight on each plate by a reference mark are identical and it is sufficient to describe means 2a. Corresponding components of means 2b are denoted by the same reference numbers followed by a letter b instead of letter a.

Means 2a comprise a diaphragm 16a having a small-diameter central aperture — of the order of 20–40 microns. The diaphragm is disposed symmetrically, with respect to mirror 7a, with the trace 3a on the plane of plate a of the perpendicular from the center of mirror 7a down to the plane of the plate. Optically, therefore, diaphragm 16a is at the same distance from lens 8a as the region of plate a which is imaged on screen 4. Thus the image of the diaphragm on screen 4 is identical with the image of that region of plate a which is projected on to the screen.

Diaphragm 16a is illuminated by a lamp 17a and a condenser 18a disposed on the opposite side of semi-transparent mirror 7a with respect to the diaphragm.

The reference mark on screen 4 appears in the form of a spot of light corresponding to the image of the illuminated aperture of diaphragm 16a.

Means are provided for adjusting the intensity of the light beams, at least along one line of sight, so as to compensate for any differences in the exposure of plates a, b.

Advantageously, the intensity-adjusting means comprise a second polarising filter such as 19a disposed inter alia near the first polariser 5a. When the polarization direction of the rectilinear polarising filter 19a is parallel to the direction of polariser 5a, the intensity of the beam leaving the polarisers is at a maximum. If polariser 19a is rotated with respect to polariser 5a, the beam intensity progressively decreases. Complete extinction is possible when the polarisation direction of polariser 19a is at right angles to that of polariser 5a.

A similar device for regulating the light intensity can be provided for the path formed by optical system Ob. If such a device is provided, the plates a, b and diaphragms 16a, 16b must be illuminated more brightly than would otherwise be necessary, since polariser 19a can only reduce the intensity of the light beam, starting from the position at which its polarisation direction is parallel to that of polariser 5a.

Mirror 13 or semi-transparent mirror 14 can be moved through an angle to modify the spacing between the respective images of the displayed regions of plates a, b on screen 4, thus modifying the appearance of relief.

Advantageously, means 20, 21 for controlling the motion of plates a, b are placed on a console 22 forming a table in front of screen 4. The operator using the apparatus sits in front of the console 22 so as to observe screen 4.

Figure 3:
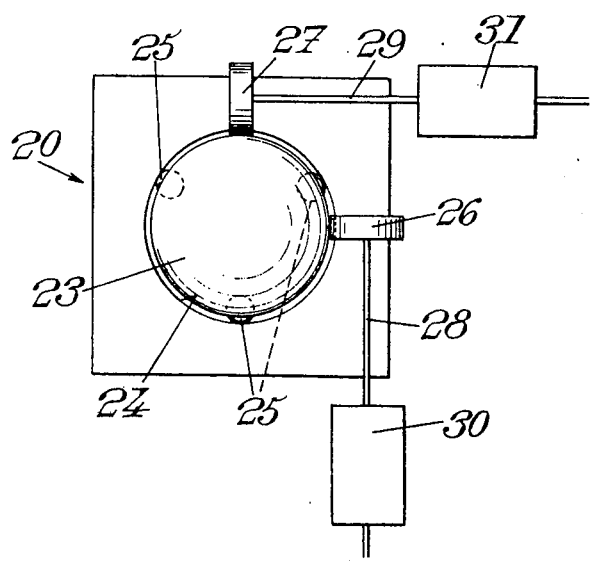
FIG. 3 is a plan view of a detail of the apparatus.

The actuating means 20 are adapted to control two variables or coordinates simultaneously. As shown in FIG. 3, means 20 comprise a sphere 23 mounted in a hemispherical dish 24 forming a bearing. Sphere 23 can be borne by balls 25 in the dish, or by an air cushion. Two rollers 26, 27 press against sphere 26. The central planes of rollers 26, 27 are identical with diametral planes of sphere 23, and are perpendicular to one another. Each roller 26, 27 rotates with a shaft 28, 29 which bears e.g. a coder 30, 31 converting the rotation of rollers 26, 27 into numerical information.

Clearly, when sphere 23 rotates around an axis perpendicular to the center plane of roller 27, roller 27 is rotated whereas roller 26 remains at rest. When sphere 23 rotates around an axis perpendicular to the central plane of roller 26, roller 26 rotates whereas roller 27 remains at rest. When sphere 23 rotates in any other manner, both rollers 26, 27 rotate at speeds depending on the motion of the sphere.

Advantageously the actuating means 20 are used in the case of an analytical plotting apparatus where the movements to be made by plates a, b in their plane are determined in a computer from coordinates X, Y, Z in real space introduced by the actuating means.

Means 20 can be used to introduce two coordinates, simply by action on sphere 23, which the operator can perform with one hand.

Figure 4:
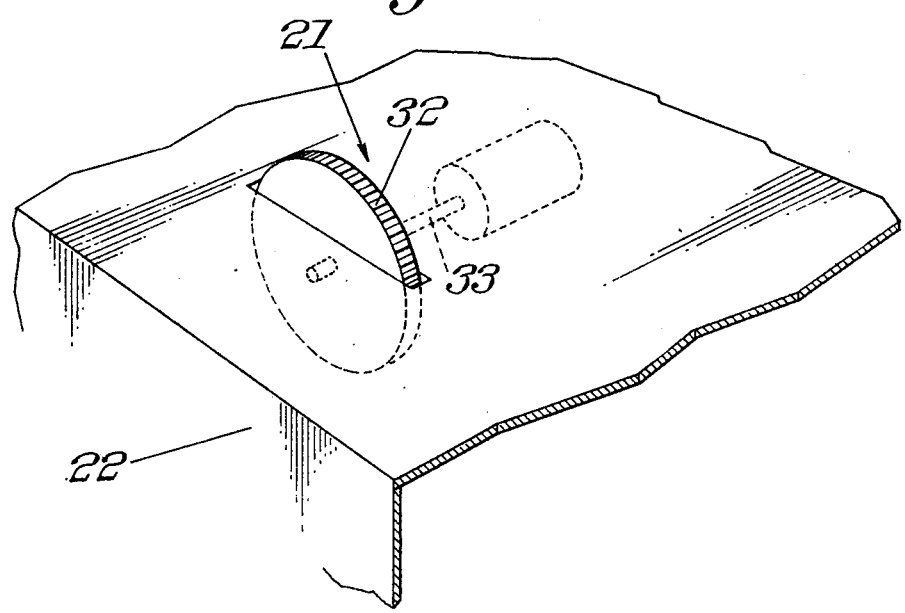
FIG. 4 is a perspective view of another detail of the apparatus.

In order to introduce a single parameter, e.g. the third or Z coordinate of real space, the actuating means 21 shown in FIG. 4 are used. Means 21 comprise a wheel 32 mounted so as to rotate a shaft 33 which in turn drives an associated coder which, in the case of an analytical plotting apparatus, sends numerical information to the computer.

Sphere 23 and wheel 32 are adapted to project from console 22 and are easily accessible to the operator, who acts on them manually.

Usually, the photogrammetric plotting apparatus comprises a tracing or display device such as an automatic tracing table 34 having an arm 35 and a tracing pen 36.

In a variant, the tracing table can be replaced by a cathode screen on which the operator can at will produce the traces corresponding to a series of points having coordinates stored by a memory.

The useful edge 37 of the tracing or display device neares screen 4 is at a distance H less than 90 cm from the vertical plane extending through the centre of screen 4 and perpendicular to the plane thereof.

The term "useful edge" denotes the edge of the useful region on which the traced or displayed lines or drawings appear.

The entire tracing or display device 34 is disposed on the same side as the observer with respect to the screen.

Device 34 is disposed at one side of the stationary observation post P, i.e. of the observer facing screen 4. As shown in the drawings, edge 37a of device 34 and the edge 38 of console 22 which is most remote from screen 4 form two sides of a right angle containing the observation post P.

Thus, the observer is at approximately the same distance from screen 4 and from the useful region of the tracing or display device. Thus the observer can easily and without fatigue watch screen 4 and then watch the plotting device 34, without having to re-focus his eyes to any substantial extent.

The apparatus according to the invention is operated in similar manner to conventional photogrammetric apparatus.

The observer, provided with analysers 6a, 6b, looks at screen 4 and sees the images of plates a, b separately. They appear in relief to the observer. By acting on controls 20 and 21, the observer causes the "spatial mark" and the observed region of the plates to coincide.

At the beginning of the operation, the observer suitably orientates the two images of the plates on screen 4. To this end, he acts on at least one of the devices 9a, 9b so as to rotate the image around the optical axis so that the two images are similarly oriented.

The orientation of one of the mirrors 13, 14, can be varied as already explained so as to modify the appearance of relief by varying the spacing between the two images of plates a, b on screen 4.

The apparatus according to the invention has numerous advantages.

Observation is under very favourable conditions since the observer, when seated, can observe screen 4 at a distance of the order of several tens of centimeters. The magnification of optical systems Oa, Ob is chosen so that the images projected on to screen 4 are sufficiently magnified for details to be analysed when they are observed from the aforementioned distance.

If necessary, the observer can approach screen 4 so as to observe a detail of the image more closely, i.e. with greater magnification.

A number of persons can simultaneously observe the images projected on to screen 4.

The observer can very easily follow the trace of device 34.

The apparatus according to the invention can operate in black and white or in colour, if plates *a, b* are themselves in colour and are illuminated by white light.

I claim:

1. A photogrammetric plotting apparatus comprising:
   two stereographic plates;
   two optical systems having respective optical axes and each for forming an image of a region of a respective one of the two stereographic plates;
   means for moving the stereographic plates in their plane with respect to said optical systems to bring corresponding regions of said plates onto the optical axes of said optical systems,
   means providing a reference mark indicating the trace of the optical axis of each said optical system on the respective plate, each said reference mark being imaged by the respective optical system; and
   observation means for observing the images formed by said optical systems;
   in which apparatus the improvement comprises:
   two different polarisers, each disposed on the optical axis of a respective one of said optical systems so that the images of the region of the respective plate and the respective reference mark are formed by the same polarised light;
   said observation means including a single screen, and said optical system being arranged to project the images of the corresponding regions of the plates and the images of the associated reference marks on said screen, whereby an operator looking at said screen through two analyzers corresponding to said polarisers sees the images of the region of one plate and its respective reference mark with one eye only and sees the images of the corresponding region of the other plate and its respective reference mark with the other eye only.

2. Apparatus as claimed in claim 1, wherein said polarisers are rectilinear polarisers and the directions of polarisation thereof are located at 90° to one another.

3. Apparatus as claimed in claim 2, further comprising intensity adjusting means to adjust the light intensity along the optical axis of at least one of said optical systems, said intensity adjusting means comprising a rectilinear polarising filter mounted for rotation aroung the optical axis, whereby said filter is progressively rotatable from a position of maximum intensity in which its polarisation direction is parallel to the polarisation direction of said polariser on the optical axis of said optical system to progressively reduce the light intensity.

4. Apparatus as claimed in claim 1, wherein said polarisers are circular polarisers, one rotating to the right and the other rotating to the left.

5. Apparatus as claimed in claim 1, wherein said means providing each reference mark comprises a diaphragm having a small-diameter aperture illuminated by a light source.

6. Apparatus as claimed in claim 5, further comprising a semi-transparent mirror, inclined at 45° to the plane of each plate, for reflecting the optical axis of the respective optical system perpendicular to the plane of said plate, said diaphragm being disposed so that said aperture and the trace of the optical axis on the plate are equispaced with respect to said mirror.

7. Apparatus as claimed in claim 6, wherein each said optical system comprises a lens disposed downstream of said semi-transparent mirror in the direction of the light path to form the images of the region of the plate and the reference mark on said screen.

8. Apparatus as claimed in claim 1, wherein the two sterographic plates lie in different planes, the apparatus further comprising an optical mirror system for reflecting the images of the corresponding regions of the plates onto said screen, said optical mirror system comprising a mirror on the line of sight of each of said optical systems at least one of said mirrors being rotatably mounted to permit adjustment of the spacing between the images projected onto the screen and thereby to modify the appearance of relief.

9. Apparatus as claimed in claim 1, further comprising, on the line of sight of at least one of said optical systems, a device which has an odd number of mirrors and is rotatable around the line of sight, said device being adapted to rotate the image projected on to said screen around the image centre.

10. Apparatus as claimed in claim 1, wherein said observation means comprises an observation post for the operator, the apparatus further comprising a tracing or display device disposed at the side of said observation post.

11. Apparatus as claimed in claim 10, wherein the useful edge of said tracing or display device near said screen is at a distance of less than 90 cm from the vertical plane extending through the centre of said screen.

12. Apparatus as claimed in claim 10, further comprising a console in front of said screen, one side of a right angle being formed by an edge of said console and the other side of the right angle being formed by the edge of the tracing or display device and said observation post being located within the sides of the right angle proximate to and at substantially equal distances from said screen and from the useful edge of said tracing or display device.

13. Apparatus as claimed in claim 1, wherein the means for moving the stereographic plates in their plane comprises co-ordinate setting means for controlling two co-ordinates, said setting means comprising a bearing cup, a sphere received freely rotatably in said bearing cup and rollers frictionally engaging the sphere, said rollers being disposed in mutually perpendicular diametral planes of said sphere.

14. A photogrammetric plotting apparatus as claimed in claim 1, wherein said means providing a reference mark includes optical means located upstream of said polarisers for directly imaging the reference marks onto the corresponding stereographic plates.

* * * * *